United States Patent [19]

Taylor

[11] 3,975,100

[45] Aug. 17, 1976

[54] METHOD AND APPARATUS FOR IMPROVING THE ACCURACY OF MEASURING THE LENGTH OF A GAGING STANDARD BY LASER INTERFEROMETER MEANS

[75] Inventor: Benjamin R. Taylor, Waterford, N.Y.

[73] Assignee: The United States of America as represented by the Secretary of the Army, Washington, D.C.

[22] Filed: Sept. 13, 1974

[21] Appl. No.: 505,826

[52] U.S. Cl. .................... 356/106 R; 33/125 A; 356/156
[51] Int. Cl.² .................................. G01B 9/02
[58] Field of Search ............... 356/106 R, 108, 109, 356/113, 156; 33/108, 125 A, 149 C, 149 R, DIG. 4; 248/481

[56] References Cited
UNITED STATES PATENTS

| | | | |
|---|---|---|---|
| 672,124 | 4/1901 | Hamilton | 33/149 C |
| 1,435,310 | 11/1922 | Kipper | 248/481 |
| 2,604,004 | 7/1952 | Root | 356/106 R |

*Primary Examiner*—John K. Corbin
*Assistant Examiner*—Conrad Clark
*Attorney, Agent, or Firm*—Nathan Edelberg; Robert P. Gibson; Harold H. Card, Jr.

[57] ABSTRACT

The accuracy with which the distance between the end faces of a length type of gaging standard can be measured by a laser interferometer is improved by mounting the gaging probe at one end of a slide in fixed coaxial alignment with a laser beam target secured to the opposite end thereof. The slide is, in turn, mounted on a slidable carrier to form a V-notch of changeable width containing a steel ball whose weight imparts a predetermined thrust to the gaging probe unaffected by the force required to move the carrier so as to bring the probe into gaging contact with a fixed surface. A planar surface is adjustably swiveled into cohesive coincidence with one end face of the length standard to duplicate the orientation thereof relative to the gaging table which supports the length standard. Thus, the contact of the gaging probe with the end face of the length standard at the start of the displacement of the laser beam target will be identical to the contact thereof with the planar face at the conclusion of the displacement thereby providing an accuracy of measurement to within several millionths of an inch.

10 Claims, 6 Drawing Figures

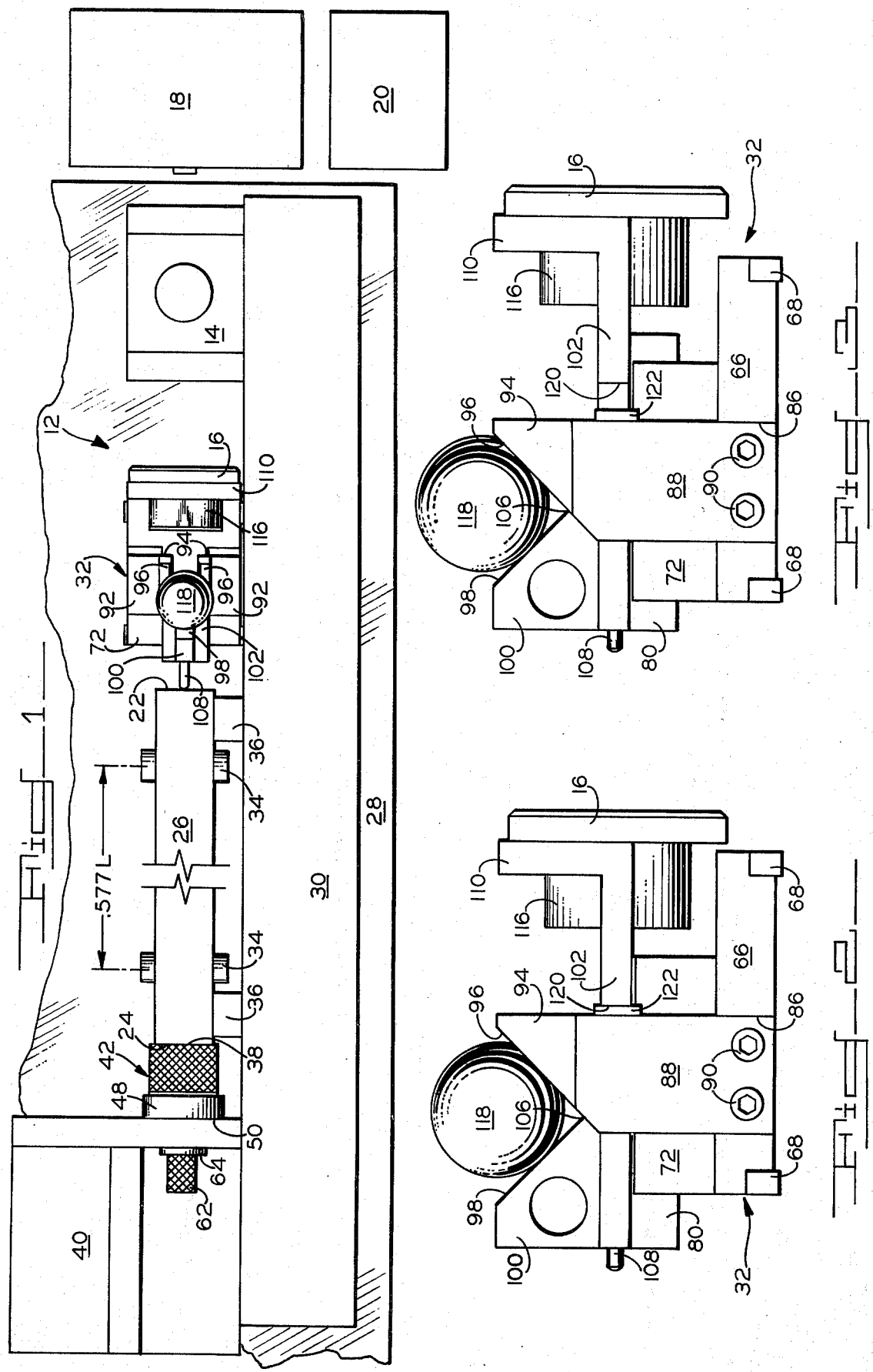

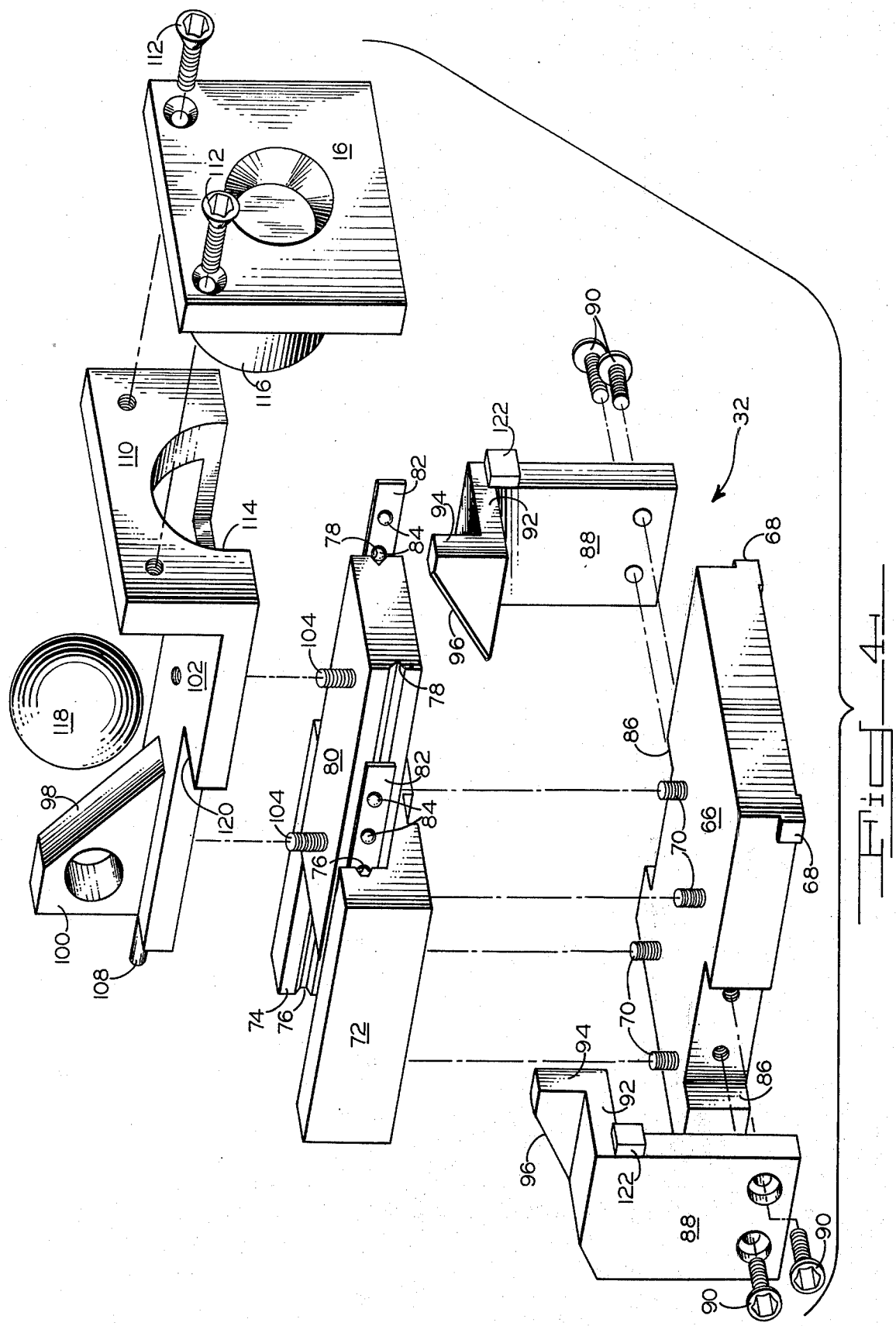

METHOD AND APPARATUS FOR IMPROVING THE ACCURACY OF MEASURING THE LENGTH OF A GAGING STANDARD BY LASER INTERFEROMETER MEANS

The invention described herein may be manufactured and/or used by or for the Government for governmental purposes without the payment of any royalty thereon.

BACKGROUND OF THE INVENTION

This invention relates to gaging standards for the ultra-precise measurement of length and is more particularly directed to a method and apparatus for increasing the accuracy with which a laser interferometer will measure the distance between the end faces of length standards.

0.05 laser interferometers are capable of measuring to accuracies of less than several millionths of an inch (.05 microns), considerable difficulty has been encountered in attaining such high degree of accuracy in the measurement of the length of gaging standards in the form of bars or rods. Such standards are customarily 20 inches (50.8 cm.) or more in length and are therefore ordinarily supported in a horizontal plane in order to avoid the foreshortening which would otherwise occur due to the increase in weight along the vertical axis when supported on one end face thereof. In current gaging set-ups for use with laser interferometers, the length standard to be measured it usually supported between centers, or is suitably clamped on a gaging table, while the gaging head is arranged to ride on one or more rails located in offset but parallel relation to one side of the standard. The sensing probe generally extends outwardly from the gaging head at right angles to the length axis of the standard while the target mirror from which the laser beam is reflected is conventionally attached to the gaging head on the side opposite the extending probe. While the end faces of length standards are parallel to each other within several millionths of an inch (0.05 microns), these faces are not necessarily in squared relation with the connecting sides therebetween to the same degree of accuracy. Consequently, the axis of travel of the probe as well as that of the target reflector may not be in true parallel alignment with the axis of the distance to be measured. Such condition is known in the field of metrology as "cosine error" and will, of course, detract from the desired accuracy of measurement.

Another undesirable characteristic of conventional fixturing equipment for laser interferometer installations lies in the offset relationship between the axis of the measured distance and the axis of the laser beam. Thus, in the event the rail surfaces are not perfectly straight, or are otherwise not fully aligned with the sides of the length standard, the degree of such misalignment will be magnified in direct ratio to the offset distance betwen the axis of the length standard and the center of the target from which the laser beam is reflected. Such condition, referred to in the art as "Abbe offset error" also detracts from the accuracy of the interferometer measurements.

Accordingly, it is an object of this invention to provide a method for the ultraprecise measurement of the distance between the end faces of a horizontally supported length standard even though the end faces thereof are not perfectly square with the connecting sides therebetween.

Another object of this invention is to provide a method of measuring, as aforesaid, wherein the distance between the end faces of a length standard is determined by a laser interferometer arranged so that the axis of the laser beam coincides with the axis of measurement of the length standard.

Still another object of this invention lies in the provision of a laser interferometer installation, as aforesaid, wherein the target mirror from which the laser beam is reflected and the sensing probe which determines the location of the target mirror relative to a known reference point are both mounted on the same positioning fixture in respective coaxial alignment.

A further object of this invention is to provide an interferometer installation, as aforesaid, wherein the accuracy of measurement is not dependent on the precision of such geometrical relationships of the sides of the positioning fixture as straightness, squareness, and parallelism.

An additional object of this invention is to provide an interferometer installation, as aforesaid, wherein the contact between the gaging probe and each of the surfaces defining the limits of the distance to be measured is automatically controlled to provide identical gaging pressures therebetween.

Another object of this invention is to provide control means, as aforesaid, which compensates for variations in the force with which the gaging probe is brought into contact with the fixed surfaces defining the distance to be measured.

A still further object of this invention lies in the provision of adjustable swivel means for orienting the fixed surface in abutment with one end face of the length standard to coincide with such end face to within one millionth of an inch (0.025 microns).

SUMMARY OF THE INVENTION

It has been found that the foregoing objects can be achieved by a method wherein the length standard to be measured is removably supported on a gaging table in parallel relation to a straightedge secured to the top of the table. In addition, the remote end face of the length standard in the direction of measurement is placed in cohesive abutment with a correspondingly oriented surface on an adjustable swivel releasably locked to the vertical wall of a right angle block which is, in turn, secured to the gaging table at one end of the straightedge. A movable carrier is divided into a base and a virtually friction-free slide thereon having a gaging probe protruding from one end thereof in coaxial alignment with the central axis through a target mirror secured to the opposite end of the slide in position to reflect a laser beam back to the transmitting head to function a digital recording unit. An inclined surface extends upwardly from each of the opposite sides of the base while a similar but oppositely inclined surface extends upwardly from the slide to cooperate with the pair of inclined surfaces on the base for forming a V-notch therebetween whose width and depth will vary in direct ratio to the relative movement between the carrier slide and the base. Thus, when a steel ball is inserted into the V-notch, the weight thereof will act on the pair of inclined surfaces to cam the slide along the base and thereby increase the width of the V-notch to the permitted maximum.

As a result of the foregoing arrangement, manual movement of the carrier base along the straightedge will bring the gaging probe into contact with the exposed end face of the length standard with a gaging pressure no greater than half the weight of the ball. Although the force imparted to the carrier base is invariably greater than that required to produce the desired gaging pressure, the excess force is not transmitted to the gaging probe but is instead expended in lifting the ball as the base continues to move forwardly relative to the now stationary slide.

The resultant reading on the recording unit is zeroed and the length standard is thereafter removed from between the gaging probe and the right angle block. The carrier is then advanced along the straightedge to bring the probe into gaging contact with the vertical face of the locked swivel with exactly the same gaging pressure as that involved in the previous contact with the end face of the length standard. Since the contact surface of the swivel was adjusted to coincide with the abutting end face of the length standard, the reading on the recording unit at the end of the forward travel of the gaging probe is an exact measurement of the distance between the opposite end faces of the length standard to within several millionths of an inch (0.05 microns). The accuracy of such reading is not dependent on perfect perpendicularity of the end faces of the length standard to the supporting gaging table or on perfect parallelism between the vertical wall surface of the right angle block and the abutting end face of the length standard.

BRIEF DESCRIPTION OF THE DRAWINGS

The exact nature of the invention as well as other objects and advantages thereof will be readily apparent from consideration of the following specification relating to the annexed drawings, wherein:

FIG. 1 is a top view of the gaging installation of the present invention with the exposed end face of the length standard in contact with the gaging probe;

FIG. 2 is an enlarged side elevation of the carrier shown prior to any gaging contact between the probe and a fixed surface;

FIG. 3 is a view similar to FIG. 2 but showing the overtravel of the base relative to the slide subsequent to contact of the gaging probe with a fixed surface;

FIG. 4 is an exploded isometric view of the carrier;

DESCRIPTION OF A PREFERRED EMBODIMENT

Figure 5:
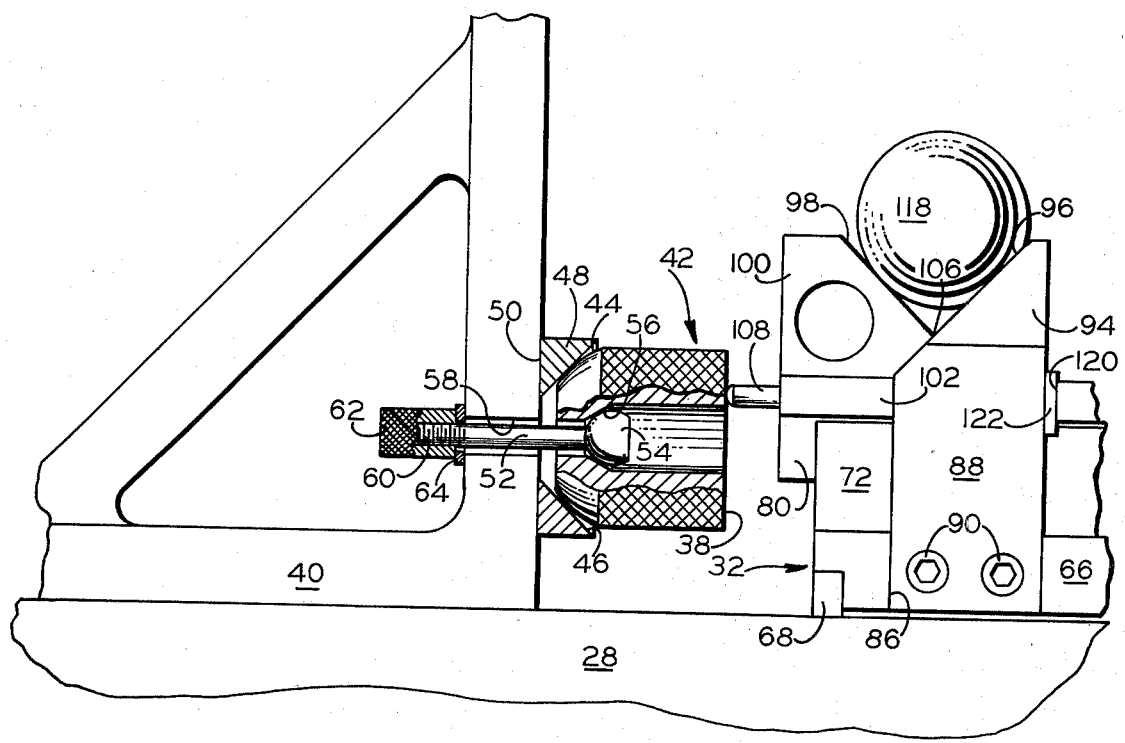
FIG. 5 is a side elevation of the swivel member with a portion thereof cut away to show the internal structure thereof.
Figure 6:
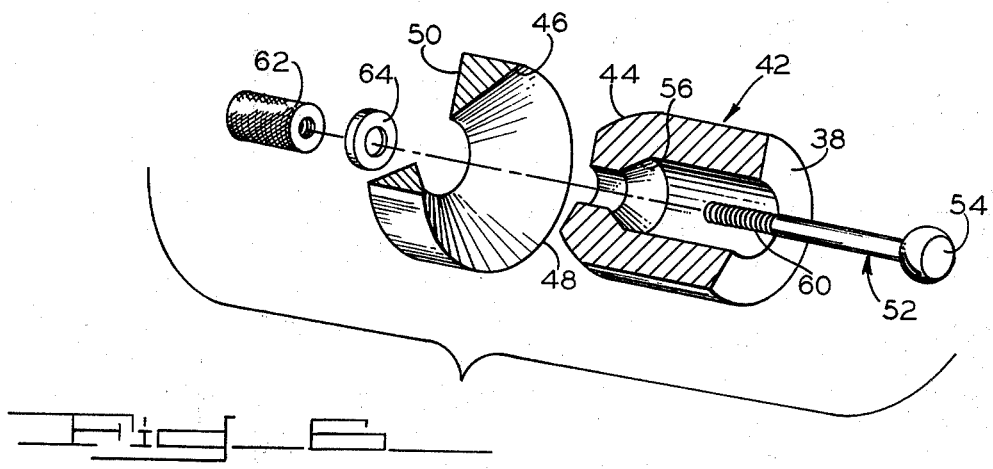
FIG. 6 is an exploded isometric view of the adjustable swivel mount for duplicating the orientation of the abutting end face of the length standard.

As shown in the drawings wherein similar reference characters are utilized to designate corresponding parts throughout, the present invention is preferably utilized with a laser system 12 of the type wherein the laser beam is transmitted through a remote interferometer 14 to impinge on a movable target retroreflector 16 and return to the transmitter unit 18 to function a digital recorder 20 for providing a continuous reading of the horizontal displacement of target 16 from interferometer 14. In order to measure the end faces 22 and 24 of a length standard 26 in the form of a bar or rod, generally at least 20 inches (50.8 cm.) long, transmitter unit 18 is preferably located in the vicinity of a gaging table 28 on which a straightedge 30 is suitably clamped along an axis parallel to the laser beam. As shown in FIG. 1, remote interferometer 14 is located at one end of table 28 in abutment with the vertical workface of straightedge 30 while target 16 is mounted to the trailing end of a movable carrier 32 which is, in turn, slidably supported on table 28 in abutment with straightedge 30.

Length standard 26 is horizontally supported by a pair of rolls 34 positioned on gaging table 28 at the "Airy points" of length standard 26, such points being those which, while equidistant from end faces 22 and 24 are also spaced apart at a distance equal to 0.577 times the length of standard 26. When thus supported, the perpendicularity of end faces 22 and 24 relative to the surface of gaging table 28 will not be altered by the effect of gravity on length standard 26. In addition, standard 26 is positioned in parallel relation with the workface of straightedge 30 by spacers 36 inserted therebetween at locations intermediate each roll 34 and the adjacent one of end faces 22 and 24. While the same parallel relationship could be achieved by placing length standard 26 in direct contact with straightedge 30, spacers 36 minimize the area of the contact surfaces susceptale to the entry of dirt.

End face 24 of length standard 26 is arranged to abut a planar surface 38 secured to a right angle block 40 suitably fastened on gaging table 28 in contact with the workface of straightedge 30. Planar surface 38 forms one end face of a sleeve 42 which terminates at the opposite end thereof in an arcuately tapered exterior 44 arranged for mating contact with a conically dished face 46 of a collar 48. The opposite face of collar 48 is a flat surface 50 arranged to be fastened to the vertical leg of right angle block 40 in coplanar abutment therewith. Collar 48 is retained in place by a screw 52 provided with an enlarged spherical head 54 arranged to fit against a correspondingly tapered end wall 56 within the interior of sleeve 42. The body of screw 52 exits from sleeve 42 and passes through collar 48 and through a suitable hole 58 in the vertical leg of right angle block 40 to terminate in a threaded end 60 for engagement with an exteriorly knurled nut 62 and an intervening washer 64. Such arrangement permits sleeve 42 to be swiveled in any direction relative to collar 48 prior to tightening of nut 62. Thus, when length standard 26 is properly positioned relative to straightedge 30 in abutment with planar surface 38 of sleeve 42, rotation of the latter which is suitably knurled will cause the extremely smooth end face thereof to cohesively adhere or, as is commonly referred to in the field of metrology, "wring to" the correspondingly smooth surface of end face 24. When such wrung contact is achieved, the contacting surfaces will conincide with one another to an accuracy of one millionth of an inch (0.025 microns). Thereupon, nut 62 is tightened on screw 52 until spherical head 54 thereof is forced against end wall 56 to lock sleeve 42 to collar 48.

As best shown in FIG. 4, carrier 32 includes a substantially rectangular baseplate 66 provided with extremely smooth pad surfaces 68 depending from the underside of each corner to contact the surface of gaging table 28 with a minimum of sliding friction. Secured to the upper face of baseplate 66, as by screws 70, is a rectangular block 72 with an upwardly opening slot 74 extending axially therethrough. The opposing sides of slot 74 are additionally recessed to form channels 76 therein. Similar channels 78 are correspondingly provided in the opposite sides of a slide 80 mounted in slot 74 for limited reciprocal movement therein. In order to provide virtual frictionless movement of slide 80 in block 72, a wafer-thin strip 82 containing a row of spaced and freely rotatable ball bearings 84 protruding from the opposite sides thereof is retained between the sidewalls of slot 74 and the mating sides of slide 80 upon completion of assembly so that the protruding portions of bearings 84 are disposed in respective rolling engagement within channels 76 and 78. Although FIG. 4 shows slide 80 projecting outwardly beyond the end of block 72 and also shows one of strips 82 extending beyond the end of slide 80, it should be understood that the true assembled relationship of these components has been altered for illustrative purposes. Actually, the disassembly of slide 80 from block 72 requires the removal of a suitable detent pin (not shown) which projects upwardly from block 72 into an elongated slot (not shown) in the underside of slide 80.

The opposite sides of baseplate 66 are rectangularly recessed, as shown at 86, to provide for the flush installation of rectangular arms 88 which are secured thereto by suitable screws 90. Arms 88 extend upwardly beyond the top of slide 80 and are each inwardly turned thereabove, as indicated at 92, to terminate in a vertical extension 94 provided with an inclined surface 96 along one edge thereof. A similar but oppositely inclined surface 98 is provided on a vertical rib 100 extending upwardly from the narrow end of a T-shaped support 102 which is, in turn, secured to the top of slide 80 by suitable screws 104. The lower portion of inclined surface 98 extends into the space between inclined surfaces 96 to cooperate therewith and form a V-notch 106 whose width and height will vary in direct ratio to the relative movement between slide 80 and block 72. A gaging probe 108 terminating in a rounded end projects outwardly from the end of support 102 on which rib 100 is located. The opposite end of support 102 is provided with a vertical plate 110 to which a laser beam target retroreflector 16 is secured, as by screws 112. Plate 110 is provided with a semi-annular cut-out portion 114 for receiving the cylindrical housing 116 projecting from retroreflector 16. A steel ball 118 is freely seated in V-notch 106 in simultaneous contact with inclined surfaces 96 and 98 so that the weight of ball 118 cams slide 80 toward the corresponding end of block 72. This movement of slide 80 is halted as shoulders 120 on support 102 contact the corresponding edges of arms 88. In order to avoid the undesirable effect of such metal-to-metal contact, pads 122 of a suitable resilient material are fixed to arms 88 to buffer the impact of shoulders 120. Thus, when carrier 32 is positioned against straightedge 30 and moved therealong until probe 108 is brought into contact with end face 22 of length standard 26, the gaging pressure therebetween is limited to the horizontal component of the weight of ball 118 regardless of the force imparted to carrier 32 during the manual movement thereof. Once probe 108 is halted upon contact with end face 22 of length standard 26, the continued movement of baseplate 66 together with block 72 will impart corresponding displacement of inclined surfaces 96 toward inclined surface 98 thereby lifting ball 118 upwardly in V-notch 106. Upon termination of this movement of baseplate 66, the weight of ball 118 will cam such baseplate 66 back relative to slide 80 until halted in an equilibrium position by the frictional contact between pad surfaces 68 and gaging table 28.

At this point, recorder 20 is adjusted to provide a zero reading. Probe 108 is then retracted out of contact with end face 22 of length standard which is then removed from the position thereof in abutment with planar surface 38. Next, carrier 32 is advanced along straightedge 30 until probe 108 is brought into contact with planar surface 38. Due to the unique structure of carrier 32, the deformation of the rounded end of probe 108 and the indentation in planar surface 38 will be identical to that incurred during the previous contact of probe 108 with end face 22 of length standard 26 so that the accuracy of measurement will not be adversely affected. Upon termination of the manual movement imparted to carrier 32, the reading displayed by recorder 20 will be the actual distance between end faces 22 and 24 of length standard 26 to an accuracy within the desired several millionth of an inch (0.05 microns).

Thus, even if the parallel end faces of the length standard are not perfectly perpendicular to the surface of gaging table 28 or parallel to planar surface 38 on right angle block 40, the desired accuracy of measurement will not be adversely affected since the contact between gaging probe 108 and each of the two surfaces which define the length being measured is identical and, consequently, any variation in the read-out for one will be duplicated in the other and therefore nullified. In addition, since the axis of measurement of length standard 26 is parallel to straightedge 30 and since carrier 32 rides along straightedge 30 between the two fixed surfaces which define the length of standard 26, the path followed by gaging probe 108 and the coaxial retroreflector 16 will be parallel to the axis along which length standard 26 is being measured. Thus, even though the exterior surfaces of carrier 32 are not perfectly straight, or the front and rear sides of carrier 32 are not perfectly parallel, or such sides are not perfectly square relative to the underside of carrier 32, the axis of movement of gaging probe 108 will nevertheless be the same as the axis of measurement of length standard 26 within the tolerances of the distance being measured.

The foregoing disclosure and description of the invention is illustrative only. Various changes may be made within the scope of the appended claims without departing from the spirit of the invention.

I claim:

1. In a measuring system wherein a laser beam is transmitted through a stationary interferometer to impinge on a horizontally movable target retroreflector for providing a continuous record of the linear displacement thereof relative to the stationary interferometer, means for measuring the distance between the parallel end faces of a length type of gaging standard to an accuracy within one millionth of an inch, comprising, means for supporting the length standard in coaxial relation with the laser beam,
   a carrier having a virtually friction-free slide thereon arranged to fixedly mount the target retroreflector at one end thereof,
   a gaging probe projecting from the opposite end of said slide in coaxial alignment with the target retroreflector, means on said carrier for applying an independent horizontal force to said slide at the conclusion of the slidable movement imparted to said carrier for bringing said probe into gaging contact with one end face of the length standard, and a swiveled planar surface releasably locked to the other end face of the length standard to duplicate the orientation thereof whereby the pressure between said gaging probe and said planar surface at the termination of the linear displacement of the target retroreflector is identical to the pressure between said probe and said one end face of the length standard at the beginning of the measuring displacement thereof.

2. The laser interferometer system defined in claim 1 wherein said means for supporting the length standard comprises, a gaging table having a straightedge fixed thereon along an axis parallel to the laser beam, a pair of rolls disposed between the length standard and said gaging table at spaced points thereon selected so that the portion of the length standard between said rolls and the portions extending therebeyond are subjected to equal gravity forces, and a pair of spacers disposed between said straightedge and the length standard to position the length axis thereof in coaxial alignment with the laser beam.

3. The laser interferometer defined in claim 2 wherein said means for locking said planar surface in the adjusted position thereof comprises, a right angle block secured to said gaging table adjacent the end thereof remote from the stationary interferometer, a sleeve having said planar surface at one end thereof and an arcuately tapered exterior at the opposite end thereof, screw means for connecting said sleeve to said right angle block to permit adjustable swivel movement relative thereto, and a nut screwed to said screw means for locking said sleeve following the adjustment of said planar surface into cohesive abutment with said one end face of the length standard.

4. The laser interferometer system defined in claim 1 wherein said carrier is provided with an upwardly opening slot therethrough for receiving said slide and a plurality of ball bearings rotatably seated between the mating sides of said slot and said slide.

5. The laser interferometer defined in claim 1 wherein said means for imparting a predetermined horizontal force to said probe comprises, an inclined surface extending upwardly from each side of said carrier, a similar but oppositely inclined surface extending upwardly from said slide in position to cooperate with said inclined surfaces on said carrier for forming a V-notch therebetween, and a steel ball seated in said V-notch whereby the horizontal component of the weight thereof cams said slide relative to said carrier to provide the same pressure during each gaging contact between said probe and a fixed surface.

6. A method for maximizing the accuracy with which the distance between the parallel end faces of a length type of gaging standard can be measured by a laser interferometer, comprising the steps of, positioning the length standard in parallel relation with a straightedge fixedly mounted on a gaging table, locking a swiveled planar surface in cohesive abutment with one end face of the length standard, sliding a carrier along the straightedge to bring a horizontally displaceable gaging probe thereon into contact with the other end face of the length standard, applying a predetermined horizontal force to the gaging probe to provide a corresponding gaging pressure between the probe and the length standard end face in contact therewith upon termination of movement of the carrier for establishing a reference location for a laser beam target retroreflector spaced from the gaging probe in fixed coaxial relation therewith, removing the length standard from between the gaging probe and the locked planar surface, and thereafter sliding the carrier along the straightedge to bring the gaging probe into contact with the locked planar surface at the same final gaging pressure as that provided by the previous contact thereof with the other end face of the length standard whereby the total horizontal displacement of the retroreflector is an accurate measurement of the distance between the parallel end faces of the length standard regardless of the deviation thereof from a true perpendicular relation to the plane of the gaging table or of the absence of true squareness relative to the adjoining sides of the carrier.

7. A system for transmitting a laser beam through a stationary interferometer to impinge on a movable target retroreflector for measuring the distance between the parallel end faces of a length type of gaging standard, comprising, a gaging table having a straightedge fixed thereon along an axis parallel to the laser beam, support means for positioning the length standard on said gaging table in spaced parallel alignment with said straightedge and in coaxial alignment with the laser beam, a carrier slidably disposed on said gaging table in slidable abutment with said straightedge, a slide mounted on said carrier for reciprocal movement relative thereto and having the target retroreflector fixed to the end thereof nearest the stationary interferometer, a gaging probe projecting from the other end of said slide in fixed coaxial alignment with the target retroreflector, said carrier and said slide having oppositely inclined surfaces thereon cooperating to form a V-notch therebetween of changeable width, a steel ball seated in said V-notch for camming said slide relative to said carrier with a force equal to one half the weight of said ball, a right angle block secured to said gaging table adjacent to the end face of the length standard remote from the stationary interferometer, a planar surface swiveled to said right angle block for adjustment into coincident abutment with the length standard end face adjacent thereto, and means for locking said planar surface in the adjusted position thereof whereby the contact of said gaging probe therewith is identical in every respect to the previous contact thereof with the end face nearest the stationary interferometer so that the displacement of the target retroreflector is an exact measure of the distance between the end faces of the length standard to an accuracy within several millionths of an inch.

8. The laser interferometer measuring system defined in claim 7 wherein said carrier includes,
a base having an upwardly extending arm fixed to each side thereof,
a block fixed on said base between said arms, said block having an upwardly opening axial slot therethrough for slidably receiving said slide,
a plurality of ball bearings disposed between the adjacent sides of said slide and said slot, and
mating channels in said carrier and said slide for rotatably supporting said ball bearings therein wherein said slide is free to reciprocate within said carrier with a minimum of friction therebetween.

9. The laser interferometer measuring system defined in claim 7 wherein said inclined surfaces of said carrier extend upwardly from the opposite sides thereof and said inclined surface on said slide is positioned at one end thereof substantially midway of said inclined surfaces on said carrier.

10. The laser interferometer measuring system defined in claim 7 wherein said means for locking said planar surface in the adjusted position thereof comprises,
a collar secured to said right angle block and having a conically dished interior facing the adjacent end face of the length standard,
a sleeve having said planar surface at one end thereof and an arcuately tapered exterior at the opposite end thereof, said sleeve also having a conical end wall within the interior thereof adjacent said arcuately tapered end,
a screw having a spherical head engageable with said conical end wall with said sleeve to position said arcuately tapered end in swiveled engagement with said conically dished interior of said collar, said screw having an elongated body terminating in a threaded end projecting outwardly from said right angle block, and
a nut threaded to the projecting end of said screw for locking said sleeve against movement relative to said collar subsequent to the adjustment thereof whereby said planar surface is inclined relative to said gaging table to the same degree as the length standard end face nearest the stationary interferometer.

* * * * *